(12) United States Patent
Devireddy et al.

(10) Patent No.: US 10,496,447 B2
(45) Date of Patent: Dec. 3, 2019

(54) PARTITIONING NODES IN A HYPER-CONVERGED INFRASTRUCTURE

(71) Applicant: Western Digital Technologies, Inc., San Jose, CA (US)

(72) Inventors: Kishore Kumar Reddy Devireddy, San Jose, CA (US); Venkatanarasimhan Kannamangalam Ramakrishnan, Fremont, CA (US); John Joseph Glen, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 83 days.

(21) Appl. No.: 15/617,021

(22) Filed: Jun. 8, 2017

(65) Prior Publication Data
US 2018/0357107 A1   Dec. 13, 2018

(51) Int. Cl.
*G06F 9/50* (2006.01)
*G06F 9/48* (2006.01)
*G06F 9/4401* (2018.01)
*G06F 9/455* (2018.01)

(52) U.S. Cl.
CPC .......... *G06F 9/5077* (2013.01); *G06F 9/4416* (2013.01); *G06F 9/4881* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 8,572,608 B2* | 10/2013 | Katiyar | ...................... | G06F 8/20 718/1 |
| 8,929,377 B2* | 1/2015 | Yang | ...................... | H04L 61/103 370/392 |
| 9,137,052 B2 | 9/2015 | Koponen et al. | | |
| 9,253,017 B2 | 2/2016 | Adlung et al. | | |
| 9,501,124 B2* | 11/2016 | Fries | ........................ | G06F 1/206 |

(Continued)

FOREIGN PATENT DOCUMENTS

WO    WO2016033691    3/2016

OTHER PUBLICATIONS

Azagury, Alain C., et al. "GPFS-based implementation of a hyperconverged system for software defined infrastructure." IBM Journal of Research and Development 58.2/3 (2014): 6-1. (Year: 2014).*

(Continued)

*Primary Examiner* — Matthew J Brophy
(74) *Attorney, Agent, or Firm* — Patent Law Works LLP

(57) ABSTRACT

Technology for partitioning nodes based on capabilities in a hyper-converged infrastructure is disclosed. In an example computer system, the system detects connection of a new node element to the computer system. The system assigns the new node element an electronic address in the computer system. The computer system then boots the new node element using a pre-existing bootable image stored at the hyper-converged infrastructure system. The computer system uses a federated control plane to discover the new node element. The federated control plane determines a capability of the new node element. The federated control plane assigns the new node element to a global storage pool.

20 Claims, 7 Drawing Sheets

(56) References Cited

U.S. PATENT DOCUMENTS

| | | | |
|---|---|---|---|
| 9,529,614 B2* | 12/2016 | Lin | G06F 21/55 |
| 9,983,888 B2* | 5/2018 | Manders | G06F 9/4416 |
| 10,108,560 B1* | 10/2018 | Lamb | G06F 3/0607 |
| 10,318,393 B2* | 6/2019 | Chelur Siddalingaiah | G06F 11/2089 |
| 2009/0293022 A1* | 11/2009 | Fries | G06F 1/206 716/132 |
| 2010/0100879 A1* | 4/2010 | Katiyar | G06F 8/20 718/1 |
| 2012/0054740 A1* | 3/2012 | Chakraborty | G06F 9/45558 718/1 |
| 2012/0166786 A1 | 6/2012 | Selitser | |
| 2015/0033227 A1* | 1/2015 | Lin | G06F 21/55 718/1 |
| 2015/0186175 A1 | 7/2015 | Van Der Walt et al. | |
| 2016/0092277 A1* | 3/2016 | Crowell | G06F 9/45558 718/1 |
| 2016/0269228 A1* | 9/2016 | Franke | H04L 41/083 |
| 2016/0359955 A1* | 12/2016 | Gill | H04L 67/1097 |
| 2017/0235773 A1* | 8/2017 | Maturi | G06F 16/00 707/736 |
| 2017/0371683 A1* | 12/2017 | Devireddy | G06F 8/63 |
| 2018/0145955 A1* | 5/2018 | Nirwal | H04L 9/0894 |
| 2018/0157521 A1* | 6/2018 | Arikatla | G06F 9/45558 |
| 2018/0157522 A1* | 6/2018 | Bafna | G06F 9/45558 |
| 2018/0157561 A1* | 6/2018 | Venkatesh | G06F 8/63 |
| 2018/0157677 A1* | 6/2018 | Bafna | G06F 3/0607 |
| 2018/0157860 A1* | 6/2018 | Nair | G06F 21/6218 |
| 2018/0159729 A1* | 6/2018 | Deshmukh | H04L 61/1511 |
| 2018/0232142 A1* | 8/2018 | Shekar | G06F 11/2089 |

OTHER PUBLICATIONS

Fietz, Jonas, et al. "Vntor: Network virtualization at the top-of-rack switch." Proceedings of the Seventh ACM Symposium on Cloud Computing. ACM, 2016. (Year: 2016).*

Jin, Xin, Nathan Farrington, and Jennifer Rexford. "Your data center switch is trying too hard." Proceedings of the Symposium on SDN Research. ACM, 2016. (Year: 2016).*

A.C. Azagury et al. "GPFS-Based Implementation of Hyperconverged System for Software Defined Infrastructure," dated Apr. 15, 2014, 2 pages, IBM Journal of Research and Development, vol. 58, Issue 2/3.

Unknown Author "Greater Agility and Continuity" dated Aug. 2014, 4 pages, Hewlett-Packard Development Company.

Anjaneya Reddy Chagam "Delivering a Standards Based SDS Framework with an Open Stack SDS Controller Implementation" dated 2014, 39 pages, SDC Storage Developer Conference.

Ramakrishan Nishtala et al. "Cisco USC Integrated Infrastructure with Red Hat Enterprise Linux OpenStack Platform and Red Hat Ceph Storage (Design Guide)," dated Nov. 20, 2015, 58 pages, Cisco.

Ilya Krutov "Lenovo Converged HX7000 Series Appliances" dated Mar. 6, 2017, 24 pages, Lenovo.

* cited by examiner

PARTITIONING NODES IN A HYPER-CONVERGED INFRASTRUCTURE

TECHNICAL FIELD

The present disclosure generally relates to hyper-converged infrastructure systems. In a more particular non-limiting example, the present disclosure relates to partitioning nodes to efficiently allocate tasks in a hyper-converged infrastructure system.

BACKGROUND

Hyper-converged infrastructure systems are systems for integrating processing, storage, and networking components of a multi-component computing system. Unlike converged systems, in which building blocks of the sub-systems remain discrete (e.g., the storage sub-system and the server sub-system are separate), hyper-converged infrastructure systems use virtualization to manage workloads through a single interface (e.g., a top of the rack switch). The hyper-converged infrastructure includes multiple node elements (e.g., bare metal computer systems), with their own compute, storage, and networking capabilities. The number of node elements is determined based on the capacity requirements and can be changed dynamically over time.

However, existing hyper-converged infrastructure systems treat the connected nodes as having homogeneous processing and storage capabilities. Thus, if the actual hardware for the nodes differs in actual resources and capabilities, the tasks to be performed by the hyper-converged infrastructure system are allocated without regard to those differences. As such, without any means of determining node capabilities and allocating tasks based on those capabilities, existing hyper-converged infrastructure systems function below their optimal efficiency.

SUMMARY

The present disclosure generally relates to hyper-converged infrastructure systems. For instance, the disclosure describes technology capable of detecting new node elements and assigning the new node to a node partition group in the hyper-converged infrastructure system. According to one aspect of the subject matter in this disclosure may be implemented in methods that include detecting connection of a new node element to a hyper-converged infrastructure system, assigning the new node element an electronic address in the hyper-converged infrastructure system, booting the new node element using a pre-existing image stored at the hyper-converged infrastructure system, discovering, using a federated control plane, the new node element, determining, using the federated control plane, a capability of the new node element; and assigning, using the federated control plane, the new node element to a global storage pool.

These and other implementations may optionally include one or more of the following features, such as, but not limited to, determining the capability of the new node element is further based on one or more of the memory resources available to the new node element, the processing resources of the new node element, and the storage resources available to the new node element; that the global storage pool includes one or more node elements assigned into one or more node partition groups, where a particular node element is assigned into a node partition group based on the capabilities associated with a particular node element; using the determined capability of the new node element to identify a particular node partition group in the one or more node partition groups associated with the determined capability; accessing capability data stored on the new node element, accessing a list of resources available to the new node element; and analyzing the list of resources associated with the new node element to determine one or more capabilities of the new node element; executing a test application on the new node element, where the test application measures the performance of the new node element to identify capabilities of the new node element; receiving, by the federated control plane, a request to execute one or more application tasks; determining one or more capabilities associated with efficiently executing the one or more application tasks; identifying a node partition group associated with the determined one or more capabilities; installing one or more software packages associated with executing the one or more application tasks on one or more node elements in the identified node partition group; and assigning one or more node elements in the identified node partition group to execute the one or more application tasks.

It should be understood, however, that the above list of features is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
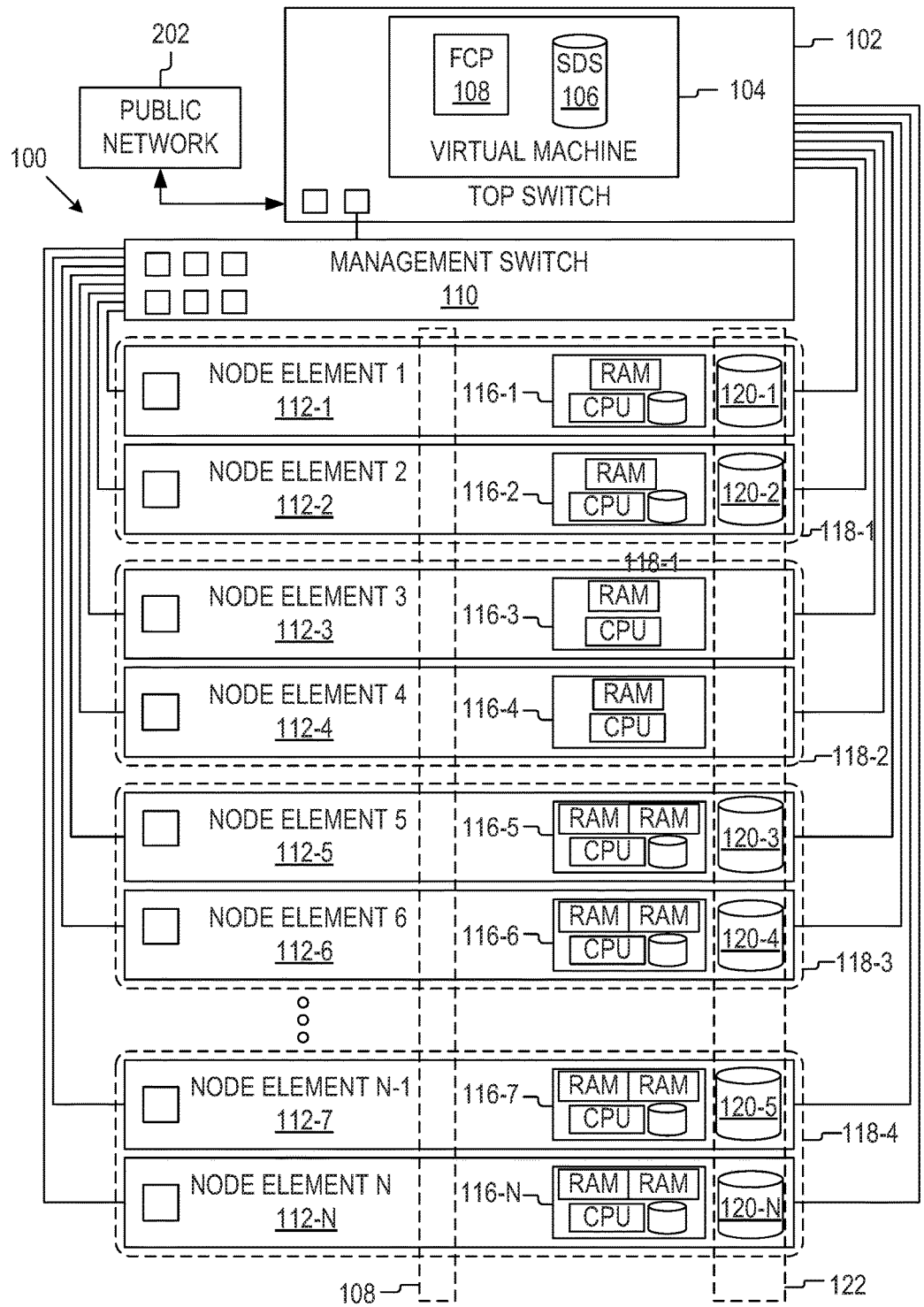
FIG. 1 is a schematic illustration of an example computing system.

The present disclosure describes technology, which may include methods, systems, apparatuses, computer program products, and other aspects, for detecting new node elements and assigning the new node to a particular node partition group in a hyper-converged infrastructure system. In the following description, for purposes of explanation, numerous specific details are set forth to provide a thorough understanding of the various aspects of different example embodiments. It will be evident, however, that any particular example embodiment may in various cases be practiced without all of the specific details and/or with variations, permutations, and combinations of the various features and elements described herein.

As a non-limiting overview of the technology, a hyper-converged infrastructure system may include a top switch (e.g., a top of the rack switch) and a plurality of node elements. The top switch may include components (e.g., software or hardware) that allow the top switch to assign a new node a network address (e.g., using a dynamic host configuration protocol (DHCP) server), provide the new node with the software or firmware used to boot the system (e.g., an image supplied by a pre-boot execution environment (PXE) server), a federated control plane (FCP), and a software defined storage (SDS) system. In some example embodiments, the components are run through a virtual machine on the top switch.

Each node element may include processing, networking, and storage resources. In addition, a particular node element may be grouped into node partition groups based on the capabilities of the processing, networking, and storage resources of the particular node.

When a new node element is connected to the top switch (e.g., physically connected to the switch), the virtual machine running on the top switch may allocate an IP address to the node element (e.g., using the DHCP server) and install a pre-built operating system image on the node element (e.g., using the PXE server). Once the node element has an IP address and an operating system, the federated control plane may discover a new node element. In some example embodiments, an instance of the federated control plane may be installed on the newly added node element.

Once the federated control plane has discovered the new node, the federated control plane may discover the resource capabilities of the new node. For example, the federated control plane, which may include an instance of program embodying the federated control plane or aspects thereof installed on the new node, may discover the resource capabilities of the new node. For example, the federated control plane may query the operating system of a node (e.g., using an appropriate command, API, etc.) for a listing of components included in the node and/or may retrieve a list of components stored in a memory/storage resource of the node, etc. The list of components may reflect memory components, storage components, processing components, I/O components, virtual components, and so on). The federated control plane may then use the list of components to determine the specific capabilities of the new node. In some example embodiments, the list of components can be stored for later reference.

The federated control plane may analyze the discovered capabilities of the new node to assign the new node to one of a plurality of node partition groups. A node partition group has an associated capability range associated with one or more of memory, processing power, and storage, that defines the capabilities of the nodes included in the group. The federated control plane may compare the capabilities of the new node element with the capability ranges associated with the plurality of node partition groups. The federated control plane may assign the new node to a particular node partition group such that the capabilities of the new node element are within the capability range that has ranges into which the new nodes capabilities fit.

When a task is assigned to the hyper-converged infrastructure system, the federated control plane may, for a particular node partition group, estimate one or more performance factors including, but not limited to: the amount of time to complete the task, the cost to complete the task (e.g., measured in processor power draw or other factors), and the amount of storage space to complete the task based on the capabilities of the particular node partition group. The node partitions groups may then be ranked based on the one or more the estimated performance factors. The federated control plane may then select a node partition group to complete the assigned task based on performance requirements for the task (e.g., requirements specified by the requesting party or generated by the hyper-converged infrastructure system based on current workload). For example, some tasks are most efficiently performed with extra working memory (e.g., RAM). Other tasks may use less working memory but use high processing speeds or processing bandwidth. The federated control plane may assign the task to the node partition group that will most efficiently perform the task. This is advantageous over traditional hyper-converged infrastructure systems because it allows many different type of node element systems to be added to the hyper-converged infrastructure system while still efficiently executing assigned tasks. Additionally, by assigning new node elements to node partition groups when the new node elements are added, completing a task requires very little overhead. Efficiently executing assigned tasks results in less power used, fewer processing cycles, and fewer reads and writes to memory.

FIG. 1 is a schematic illustration of an example computing system. The computing system may be a hyper-converged infrastructure system 100 that includes a top switch 102 (or top of the rack switch), a management switch, 110, and a plurality of node elements 112-1 to 112-N. It should be recognized that when there are multiple instances of a similar element are depicted they will be labeled with the same reference number followed by a dash ("-") and another number or letter (e.g., 112-3) to designate different instances. In the event a reference numeral appears in the text without a dash and subsequent number or letter, for example, "112," it should be recognized that such is a general reference to different embodiments of the element or component bearing that general reference numeral.

In some example embodiments, the top switch 102 may include a pre-installed operating system (such as a Linux operating system). In some example embodiments, the operating system may include a kernel-based virtual machine (KVM) 104. In some example embodiments, the virtual machine 104 may run a pre-boot execution environment (PXE), a dynamic host configuration protocol (DHCP), federated control plane 108 (FCP), and a software defined storage system 106 (SDS). The top switch 102 may be connected to a public network 202 through a network communication port.

The pre-boot execution environment (PXE) may include a series of prebuilt operating system images. As new node elements 112 are added to the system 100, the pre-boot execution environment installs or boots the images into the newly added node element 112. The dynamic host configuration protocol may be configured with a range of IP address that can be allocated to node elements 112 as needed.

In some example embodiments, the federated control plane 108 may be used to discover new node elements 112 after the new node elements are attached to the top switch 102 and have been given an IP address by the DHCP. The federated control plane 108 may analyze a node element 112 to determine the capabilities of the node element 112. Potential capabilities include working memory (e.g., amount of RAM available to a particular node element 112), the speed of working memory (e.g., how fast are reads and writes executed), the speed and throughput of the one or more processors, the amount of storage available to the node element 112, and so on. The federated control plane 108 may partition the newly added node element 112 into a particular node partition group (118-1 to 118-4) based on the determined capabilities of the newly added node element 112.

The software defined storage system 106 may receive information about the storage resources of the node elements 112-1 to 112-N from the federated control plane 108. Using this information, the software defined storage system 106 may create a global storage pool 122 that can be accessed as a single virtualized storage pool.

A management switch 110 may connect to the top switch 102 and to the intelligent platform management interface (IPMI) of the nodes to collect information about the status of the plurality of node elements (112-1 to 112-N), including but not limited to the temperature, voltages, fans, power supplies, and so on of the node elements (112-1 to 112-N). The management switch 110 may also query information from the nodes (e.g., logged status information or inventory information) and perform some recovery procedures. Any relevant information may then be passed on to the top switch 102.

A node may include one or more processors, memory, and, in some embodiments, storage. The processing, memory, and storage resources of node elements (116-1 to 116-N) may define the capabilities of the node element (112). In some example embodiments, a node may include computer system(s) without independent operating systems (e.g., bare metal machines). The node elements may be the same type of bare metal system (e.g., with the same resources) or different types of bare metal systems (e.g., with resources that vary by node element). In addition, a node element 112 may connect to the management switch 110 to report status information through the IPMI and connects to the top switch 102 for high-speed data transmission (e.g., information used to perform the tasks assigned by the federated control plane 108). In some example embodiments, a node may include an operating system and other suitable computing components.

The memory resources of a node may include computer memory. For example, the computer memory included in a particular node may include high-speed random-access memory, such as dynamic random-access memory (DRAM), static random-access memory (SRAM), double data rate random-access memory (DDR RAM), or other random-access solid state memory devices, although other suitable memory devices are also possible and contemplated.

Storage resources may include in a given node may include non-volatile memory, such as one or more magnetic disk storage devices, optical disk storage devices, flash memory devices, or other non-volatile solid state storage devices. The memory and storage resources, or alternatively, the non-volatile memory device(s) within the memory and storage resources, comprise(s) a non-transitory computer-readable storage medium.

The processing resources of a node may be based on the one or more processors included within the node. Processors included in a node can include a variety of different processors including, but not limited to, a computer processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof. A processor may include both single core and multi-core processors that may comprise two or more independent processors (also referred to as "cores") that may execute the instructions contemporaneously. Thus, a node may include a single processor with a single core, a single processor with multiple cores (e.g., a multi-core processor), multiple processors with a single core, multiple processors with multiple cores, or any combination thereof. In addition, nodes can use a plurality of different processor architecture types including but not limited to the x86 processor architecture, the advanced RISC machine (ARM) architecture, the Power PC architecture, and so on.

The federated control plane 108, or an instance thereof, is running on the node elements 112, giving the federated control plane 108 a global view and the ability to determine how application tasks should be most efficiently deployed. In addition, some node elements (112-1, 112-2, and 112-5-112-N) include storage resources. In some example embodiments, a portion the storage resources are allocated to the local nodes resources (116-1, 116-2, and 116-5-116-N) and another portion of the storage resources (120-1 to 120-N) are allocated to the global storage pool 122 controlled by the software defined storage system 106.

The federated control plane 108 may partition node elements 112 into a plurality of node partition groups (118-1 to 118-4) based on the resources (116-1 to 116-N) associated with a particular node element 112. In this way, a node partition group (118-1 to 118-4) in the plurality of node partition groups includes node elements 112 with at least roughly similar resources (116-1 to 116-N). As noted above, a particular node partition group (118-1 to 118-4) may be defined by a range of performance values associated with one of processor resources, memory resources, and storage resources. For example, node partition group A may include node elements whose processing resources are in the range of 4 to 5 GFLOPS (billion floating point operations per second) per core and at least 4 cores. Thus, if a given node element is measured or otherwise known to have processing resources that fall within this range, the node element will be partitioned or grouped with node partition group A.

In the example embodiment shown in FIG. 1, four different node partition groups are displayed, 118-1 to 118-4. A particular node partition group 118 is associated with different capabilities and different resources 116. Node partition group 1 118-1 includes node elements 112-1 and 112-2 which have resources 116-1 and 116-2 and storage units 120-1 and 120-2 respectively. Although difficult to represent visually, node partition group 1 118-1 has additional processing resources and is determined to be for processing intensive tasks.

Node partition group 2 118-2 includes node elements 112-3 and 112-4 which have resources 116-3 and 116-4 respectively. The node elements 112-3 and 112-4 in node partition group 118-2 have no storage resources and are thus part of a stateless node partition group 118-2. This node partition group 118-2 is used for application tasks that do not use storages resources or can store the data at another location.

Node partition group 3 118-3 includes node elements 112-5 and 112-6 which have resources 116-5 and 116-6 and storage units 120-3 and 120-4 respectively. The node elements 112-5 and 112-6 partitioned into node partition group 3 118-3 have excess memory resources. Thus, node partition group 3 118-3 is used for memory intensive tasks.

Node partition group 4 118-4 includes node elements 112-7 and 112-N which have resources 116-7 and 116-N and storage units 120-5 and 120-N respectively. The node elements 112-7 and 112-N partitioned into node partition group 4 118-4 have both more powerful processing resources and excess memory resources. Thus, node partition group 4 118-4 is used for tasks that are both processor and memory intensive.

Figure 2:
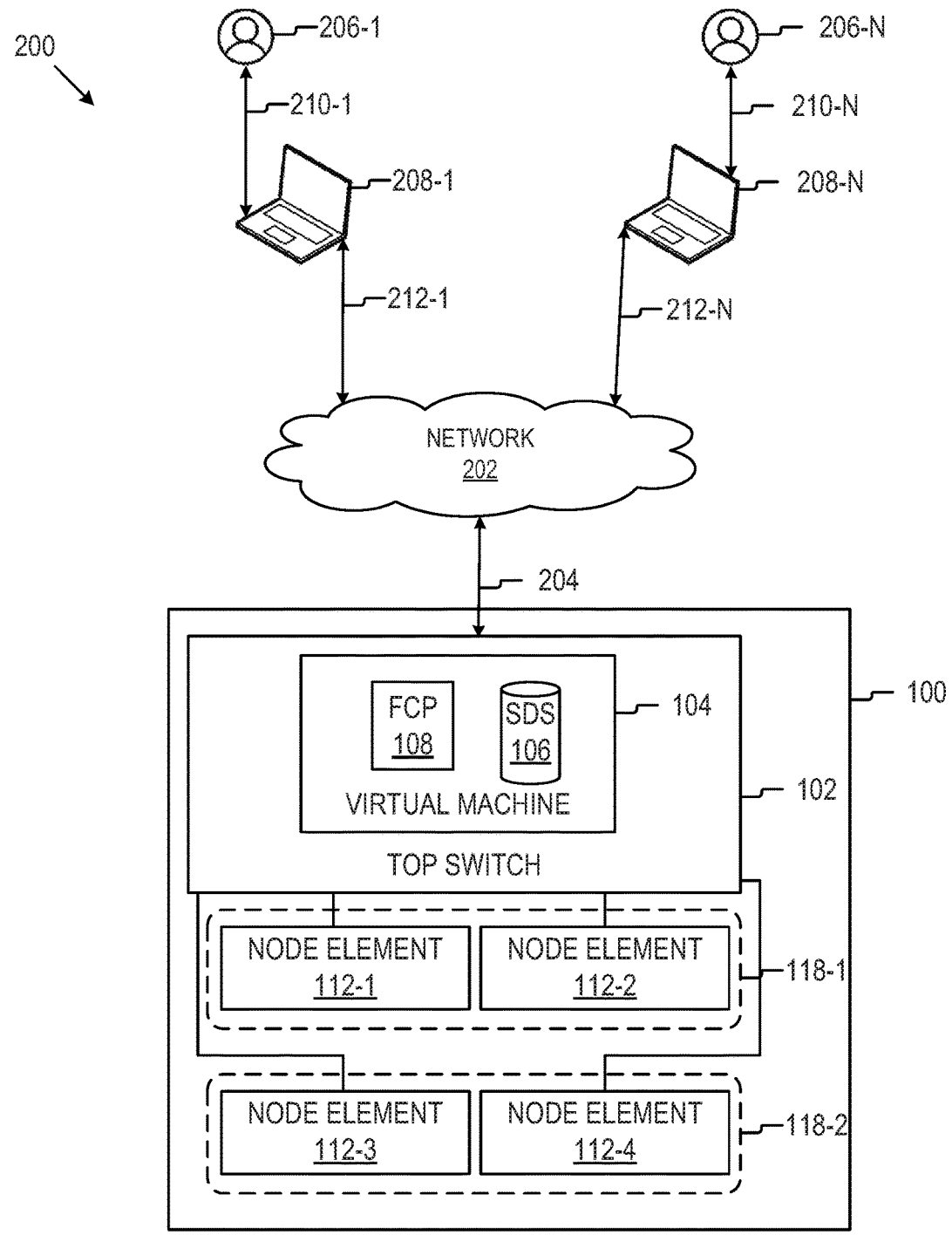
FIG. 2 is a schematic illustration of example computing systems connected over a network.

FIG. 2 is a schematic illustration of an example hyper-converged infrastructure system 100 connected over a network 202. The network 202 may be a conventional type, wired or wireless, and may have numerous different configurations including a star configuration, token ring configuration, or further configurations. The network 202 may include a wide area network (WAN) (e.g., the Internet), a local area network (LAN), a virtual private network (VPN), and/or further interconnected data paths across which multiple devices may communicate. In some instances, the network 202 may be a peer-to-peer network. The network 202 may also be coupled to or includes portions of a telecommunications network for sending data in a variety of different communication protocols.

The computing system 100 may be communicatively connected over signal lines 204 respectively to the network 202. The computing systems 208-1 to 208-N are be communicatively connected over signal lines 212-1 to 212-N respectively to the network 202. The users 206-1 to 206-N may be interact with the computing systems 208-1 to 208-N (also simply referred to as 208) as indicated by the lines 210-1 to 210-N. For example, the user 206 may use an object storage system hosted across the distributed computing system by interacting with the computing system 208.

In some embodiments, the computing systems 208 are client devices that include non-transitory memor(ies), processor(s), and communication unit(s), and other components that are communicatively coupled via a communications bus. The computing system 208 may couple to the network 202 and can send and receive data to and from other system 200 entities. Non-limiting examples of a computing system 208 include a laptop computer, a desktop computer, a tablet computer, a mobile telephone, a personal digital assistant (PDA), a mobile email device, a wearable device, an embedded computing device, or any other electronic device capable of processing information and accessing a network 202.

In connecting the hyper-converged infrastructure system 100 over a network 202 to one or more client systems 208-1 to 208-N, a client system 208 can request that the hyper-converged infrastructure system 100 perform a particular task (e.g., by submitting the request through the network 202.) In some example embodiments, the top switch 102 receives (e.g., through a network communication port) the request to perform a particular task.

The top switch 102 runs a virtual machine 104 that includes a federated control plane 108 and a software controlled storage system 106. The federated control plane 108 analyzes the requested task to determine what resources would allow the task to be completed as efficiently as possible. Once the task has been analyzed, the federated control plane 108 selects a node partition group (118-1 to 118-4) that has capabilities that match the resources identified by the federated control plane 108. The federated control plane 108 then assigns the task to a node element (112-1 to 112-2) the in the selected node partition group (118-1 and 118-4).

Figure 3:
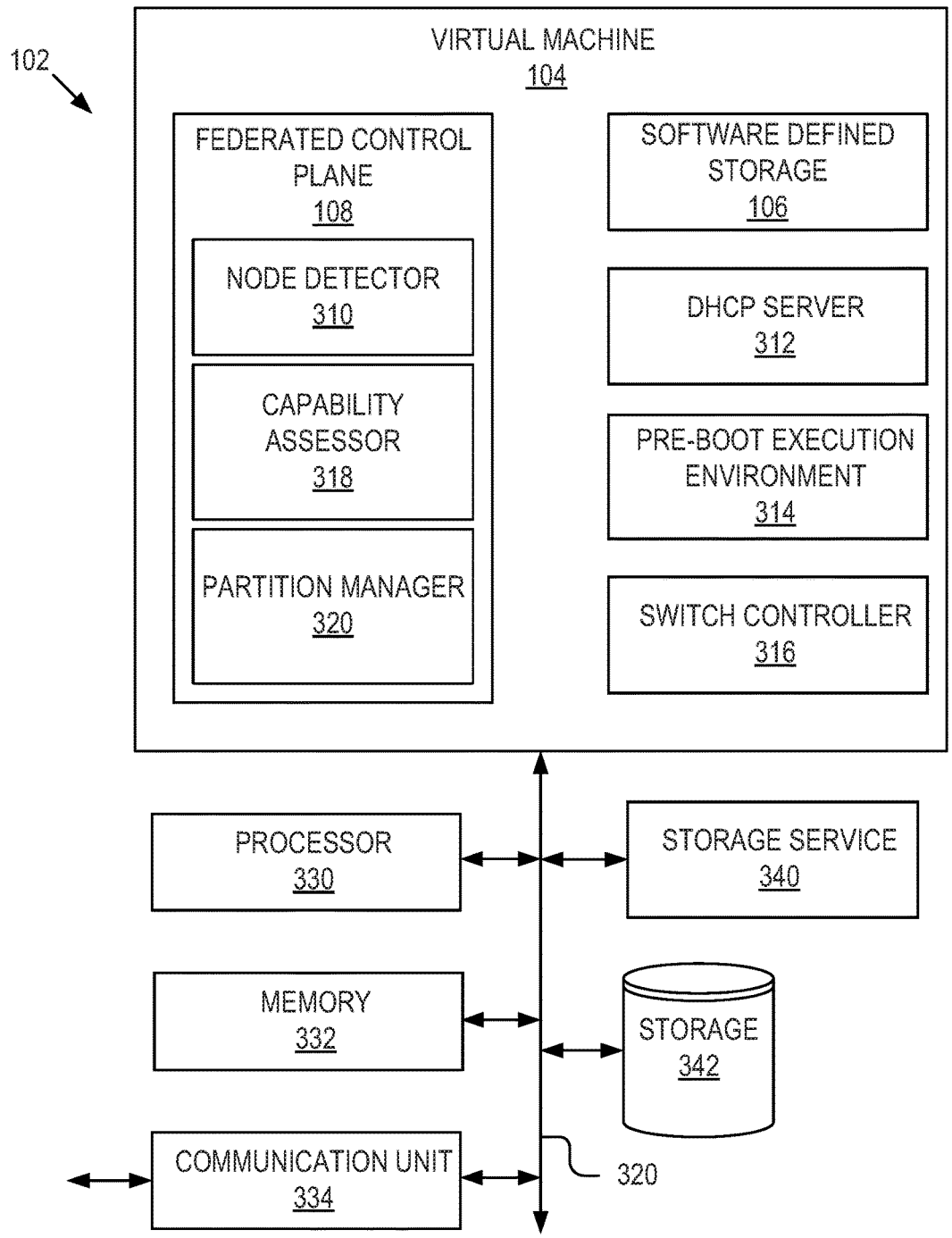
FIG. 3 is a block diagram of an example switch.

FIG. 3 is a block diagram of an example switch. While the virtual machine 104 is shown as being a part of a top switch 102, it is appreciated that the acts and/or functionality described with respect to the virtual machine 104 may be embodied in other servers or systems within the hyper-converged infrastructure system 100. Also, note that while the term 'top switch' is used to refer to item 102, particularly in describing FIG. 3, in other parts of the application top switch 102 may alternatively be referred to as 'fabric element', or simply 'computing device'. While the functionality of these various terms may be split amongst more than one computer device, for simplicity the functionality is often combined in to a single switch and thus is illustrated as such in this description.

The top switch 102 includes a processor 330, a memory 332, a communication unit 334, a storage service 340, a storage device 342, and, running on the top switch 102, a virtual machine 104. In some implementations, the components of the top switch 102 are communicatively coupled by a bus 320.

The processor 330 includes an arithmetic logic unit, a microprocessor, a general-purpose controller, or some other processor array to perform computations and provide electronic display signals to a display device. The processor 330 is coupled to the bus 320 for communication with the other components. Processor 330 processes data signals and may include various computing architectures including a complex instruction set computer (CISC) architecture, a reduced instruction set computer (RISC) architecture, or an architecture implementing a combination of instruction sets. Although FIG. 3 includes a single processor 330, multiple processors 330 may be included. Further processors, operating systems, sensors, displays and physical configurations are possible.

The memory 332 includes one or more non-transitory computer readable media. The memory 332 stores instructions and/or data that may be executed by the processor 330. The memory 332 is coupled to the bus 320 for communication with the other components. The instructions and/or data may include code for performing the techniques described herein. The memory 332 may be a dynamic random access memory (DRAM) device, a static random access memory (SRAM) device, flash memory, or some other memory device. In some instances, the memory 332 also includes a non-volatile memory or similar permanent storage device and media including a hard disk drive, a floppy disk drive, a CD ROM device, a DVD ROM device, a DVD RAM device, a DVD RW device, a flash memory device, or some other mass storage device for storing information on a more permanent basis.

The communication unit 334 transmits and receives data to and from the network 202. The communication unit 334 is coupled to the bus 320. In some instances, the communication unit 334 includes a port for direct physical connection to the network 202 or to another communication channel. For example, the communication unit 334 includes a USB, SD, CAT-6 or similar port for wired communication with the network 202. In some instances, the communication unit 334 includes a wireless transceiver for exchanging data with the network 202 or other communication channels using one or more wireless communication methods, including IEEE 802.11, IEEE 802.16, BLUETOOTH® or another suitable wireless communication method. Although FIG. 3 includes a communication unit 334, multiple communication units 334 may be included.

In some instances, the communication unit 334 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some instances, the communication unit 334 includes a wired port and a wireless transceiver. The communication unit 334 also provides other conventional connections to the network 202 for distribution of files and/or media objects using standard network protocols including TCP/IP, HTTP, HTTPS, SSL, and SMTP, etc.

The storage service 340 can include software including routines for storing and retrieving data from the one or more node elements 112-1 to 112-N. More particularly, the storage service 340 may assist the federated control plane 108 and the software defined storage system 106 to coordinate storage and retrieval from hard disk drives on node elements 112-1 to 112-N.

The storage device 342 can be a non-transitory memory that stores data for providing the functionality described herein. The storage device 342 may be a dynamic random access memory (DRAM) device, a static random access memory (SRAM) device, flash memory, or some other memory devices. In some instances, the storage device 342 also includes a non-volatile memory or similar permanent storage device and media including a hard disk drive, a floppy disk drive, a CD ROM device, a DVD ROM device, a DVD RAM device, a DVD RW device, a flash memory device, or some other mass storage device for storing information on a more permanent basis.

In the implementation shown in FIG. 3, the virtual machine 104 running on the top switch 102 includes a federated control plane 108, a software defined storage system 106, a DHCP server 312, a pre-boot execution environment 314, and a switch controller 316. In some example embodiments, these components of the virtual machine 104 interact, communicate, and share data. In some example embodiments, the virtual machine 104 and its components are designed to run on specially designed circuitry. In other embodiments, the virtual machine and its components are software stored in memory 332 and are executed on processor 330.

In some example embodiments, the federated control plane 108 includes a node detector 310, a capability assessor 318, and a partition manager 320. The node detector 310 may determine whether any new node elements 112 are attached to the top switch 102. In some example embodiments, when a newly added node element 112 is attached to the top switch, an asynchronous notification is generated and transmitted to the node detector 310. In other embodiments, the node detector 310 periodically polls the top switch node data to determine whether a newly added node element 112 has been added.

The capability assessor 318 may determine, when a newly added node element 112 is added to the top switch 102, the specific capabilities of the node element 112. For example, the capability assessor 318 accesses a list of resources 116 available to the newly added node element 112 including the processing, memory, and storage resources of the newly added node element 112.

The partition manager 320 may use the determined capabilities of the new node elements 112 to assign or partition the newly added node element 112 to a particular node partition group 118. In some example embodiments, the newly added node element 112 is assigned to the particular node partition group 118 based on the determined capabilities of the newly added node element 112 and the existing capabilities of the particular node partition group 118. In this way, a particular node partition group 118 consists of node elements 112 that have similar capabilities.

In some example embodiments, the software defined storage system 106 receives information about the storage resources of the node elements 112-1 to 112-N from the federated control plane 108. Using this information, the software defined storage system 106 may create a global storage pool 122. The software defined storage system 106 may then provide access to the global storage pool 122 through a virtualization system.

The Dynamic Host Configuration Protocol server (DHCP) 312 may allocate IP address to node elements 112 as the node elements are added to the top switch 102. The IP address may allow the top switch 102 to communicate with a specific node element 112 in the plurality of node elements 112-1 to 112-N.

In some example embodiments, the pre-boot execution environment 314 is populated with pre-built operating system images to be installed or booted on the Node elements. In some example embodiments, the switch controller 316 controls and co-ordinates communication between the top switch 102 and plurality of node elements 112.

Figure 4:
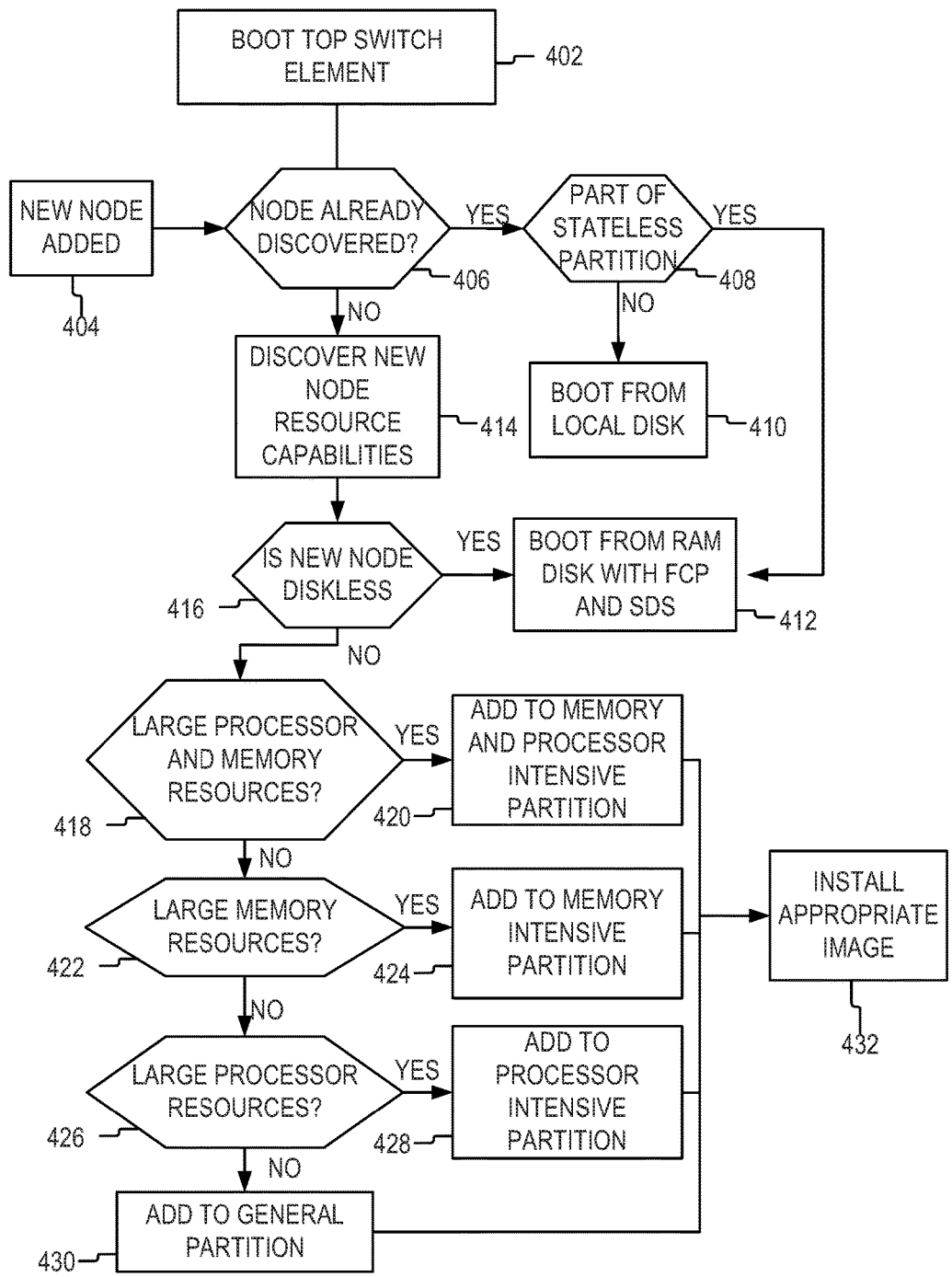
FIG. 4 is a flowchart of an example method for detecting new node elements and assigning the new node to a node partition group in the hyper-converged infrastructure system.

FIG. 4 is a flowchart of a method for detecting new node elements and assigning the new node to a node partition group 118 in the hyper-converged infrastructure system, in accordance with some example embodiments. As illustrated, the top switch 102 is powered on, initialized, or booted up (402). During the boot-up or initialization process, the top switch 102 may begin running a virtual machine 104 The virtual machine 104 may include a plurality of services associated with the operation of the top switch 102. For example, the virtual machine 104 may include or manages a federated control plane 108, a software defined storage system 106, a pre-boot execution environment 314, and a DHCP server 312. Once the top switch 102 fully initializes the virtual machine 104 and runs the associated services, the top switch 102 is prepared to detect and respond to a newly added node element 112 being connected to the top switch 102.

When a newly added node element 112 is added (404) to the hyper-converged infrastructure system 100 by connecting the node element 112 to the top switch 102, the top switch 102 may determine whether the node element 112 has already been discovered (406). In accordance with a determination that the node element 112 has already been discovered (e.g., is recorded in the list of known node elements 112), the top switch 102 may determine (408) whether the node element 112 is part of the stateless node partition group 118-2.

In some example embodiments, the top switch 102 may determine whether the newly added node element 112 is assigned (or should be assigned) to the stateless node partition group 118-2 by determining whether the newly added node element 112 includes any storage resources (e.g., flash memory, a spinning medium memory device, or other long term storage options). If a particular node element 112 does not include any storage resources, the top switch 102 may determine that the newly added node element 112 is part of the stateless node partition group 118-2 and boots (412) the newly added node element 112 with an image stored on the ram disk associated with the top switch 102 (e.g., images available to the PXE). The images, once installed, include a local copy or instance of the federated control plane 108 and software defined storage system 106. The node element 112 may then ready to be used by the hyper-converged infrastructure system 100.

In accordance with a determination that the node element is not part of the stateless node partition group 118-2, the top switch 102 may boot the newly added node element 112 from its local disk, which already includes the appropriate services.

In accordance with a determination that the newly added node element 112 is not already discovered, the top switch 102 may provide a DHCP IP address and a PXE image to boot. Once the newly added node element 112 is addressable and is booted using the image, the federated control plane 108 may discover (414) the resource capabilities of the newly added node element 112. In some example embodiments, may discover a node element's 112 capabilities include accessing information about the resources (e.g., 116-1 to 116-N in FIG. 1) available to the node element 112 from data stored on the node element 112 itself. For example, the node element 112 includes metadata describing the capabilities of the node element. In other embodiments, the node element 112 may include a list of resources available to the node element 112 and the federated control plane 108 may use that list to determine the capabilities of the node element 112.

In some example embodiments, the federated control plane 108 may determine (416) whether, based on the discovered capabilities of the newly added node element 112, the newly added node element 112 is diskless. As above, the federated control plane 108 may determine whether the newly added node element 112 is diskless by determining whether the newly added node element 112 has any attached storage resources (permanent or long-term storage). If not, the federated control plane 108 may determine that the newly added node element 112 is diskless. As such, the newly added node element 112 is booted (412) with an image stored on the ram disk associated with the top switch 102 (e.g., images available to the PXE). The images include a local copy or instance of the federated control plane 108 and software defined storage system 106. The federated control plane 108 may also add the newly added node element 112 to the stateless node partition group 118-2.

In accordance with a determination that the newly added node element 112 includes one or more storage resources, the federated control plane 108 may determine (418) whether, based on the resources 116 associated with the newly added node element 112, the newly added node element 112 has processor resource and memory resources that exceed both a predetermined threshold for processor resources and a predetermine threshold for memory resource, respectively. In some example embodiments, the predetermined thresholds for processors and memory may be determined based on the requirements of the hyper-converged infrastructure system 100.

In other embodiments, the predetermined threshold may be set to include only a certain percentage of top performing node elements 112 included in the hyper-converged infrastructure system 100. For example, the threshold for processing resources determines that only the top 10% percent of node elements 112, measured based on the number of floating point operations per second (FLOPS), are determined to have exceeded the threshold. Threshold values can also be dynamic and increase as the overall performance of the node elements increases. In some example embodiments, a node that was originally determined to exceed a threshold value can be reevaluated and repartitioned if the threshold values change.

In some example embodiments, the federated control plane 108 considers the speed and throughput of the processor (e.g., if the processor is multithreaded) as well as the number of processors available to the newly added node element 112. Similarly, memory resources may determine the amount of random access memory (RAM) available, the type of RAM, the speed the RAM operates at (e.g., the clock speed associated with the RAM), and the time elapsed during a read to and write from the RAM.

In accordance with a determination by the federated control plane 108 that the newly added node element 112 has processor and memory resources that both exceed a predetermined threshold, the federated control plane 108 may add (420) the newly added node element 112 to the memory and processor intensive node partition group 118-4.

In accordance with a determination by the federated control plane 108 that the newly added node element 112 does not have processor and memory resources that both exceed a predetermined threshold, the federated control plane 108 may determine (422) whether the newly added node element 112 at least has memory resources that exceed the predetermined threshold for memory resources. If so, the federated control plane 108 may add (424) the newly added node element 112 to the memory intensive node partition group 118-3.

In accordance with a determination by the federated control plane 108 that the newly added node element 112 does not have memory resources that exceed a predetermined threshold, the federated control plane 108 may determine (426) whether the newly added node element 112 at least has processor resources that exceed the predetermined threshold for processor resources. If so, the federated control plane 108 may add (428) the newly added node element 112 to the processor intensive node partition group 118-1.

In accordance with a determination that the newly added node element 112 does not have processor resources that are larger than a predetermined threshold, the federated control plane 108 may add (430) the newly added node element 112 to the general node partition group. In some example embodiments, the general node partition group may include node elements 112 that were not sorted into another node partition group 118.

In some example embodiments, once the newly added node element 112 has been added to a particular node partition group, an appropriate image associated with the particular node partition group may be selected. The selected image is then installed (432) on the newly added node element 112.

Figure 5:
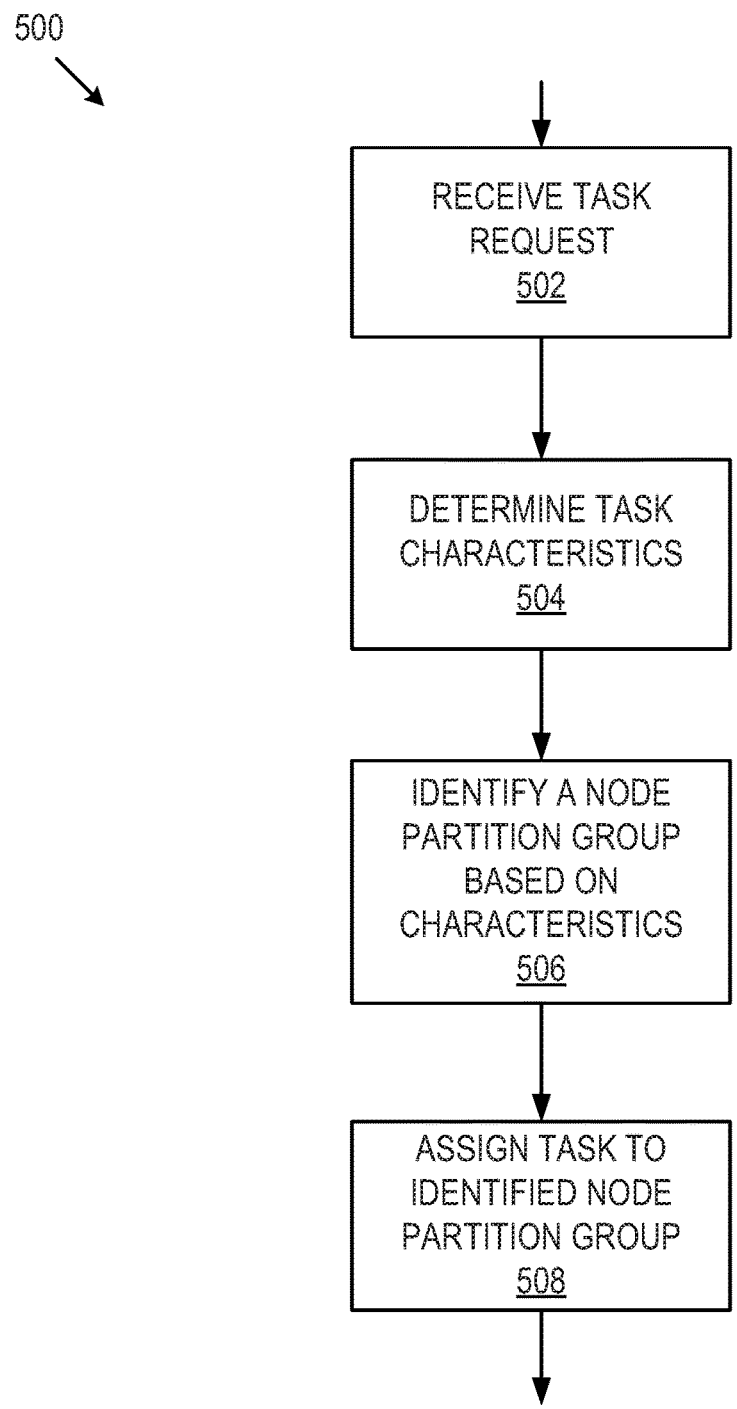
FIG. 5 is a flowchart of an example method for assigning a task to a node partition group based on a determination of the most efficient node partition group.

FIG. 5 is a flowchart of an example method for allocating tasks to appropriate node partition groups 118 based on the elements of the allocated tasks, in accordance with some example embodiments. In some example embodiments, the top switch 102 may receive (502) a request to complete a task. In some example embodiments, the request may be generated from a client system 208 or a third-party system and transmitted over the network 202 to the hyper-converged infrastructure system 100. In other embodiments, the request is generated internally to the hyper-converged infrastructure system 100 or a related system and is transmitted to the top switch 102 when execution of the application task is required.

In some example embodiments, the top switch 102 may employ the federated control plane 108 to analyze the request and determine (504) characteristics of the task 504. For example, the federated control plane 108 estimates the time, processing power, memory, and storage used to efficiently complete the task. In another example, a video rendering task may require high memory and processing resources. In another example, storing a user's entire collection of photographs would require high storage resources but not relatively high processing resources.

In some example embodiments, the federated control plane 108 may identify (506) a node partition group 118 to execute the task based on the determined task characteristics and the capabilities associated with the node partition group 118. For example, if the task is to store a user's photographs, a node partition group 118 that includes sufficient storage but is not processor or memory intensive is selected. Similarly, a node partition group 118 with high memory and processing resources is selected to render a large amount of video content.

Once a node partition group 118 has been identified, the federated control plane 108 may assign the requested task to one or more node elements 112 in the identified node partition group 118. As noted above, the node elements 112 in a given node partition group 118 have one or more capabilities in common and thus the federated control plane 108 can accurately estimate the ability of the node element 112 to efficiently complete the task. Thus, by first selecting a particular node partition group 118 to complete a given task, the federated control plane 108 may ensure that the task will be completed in a reliable and efficient manner with minimal overhead.

Figure 6A:
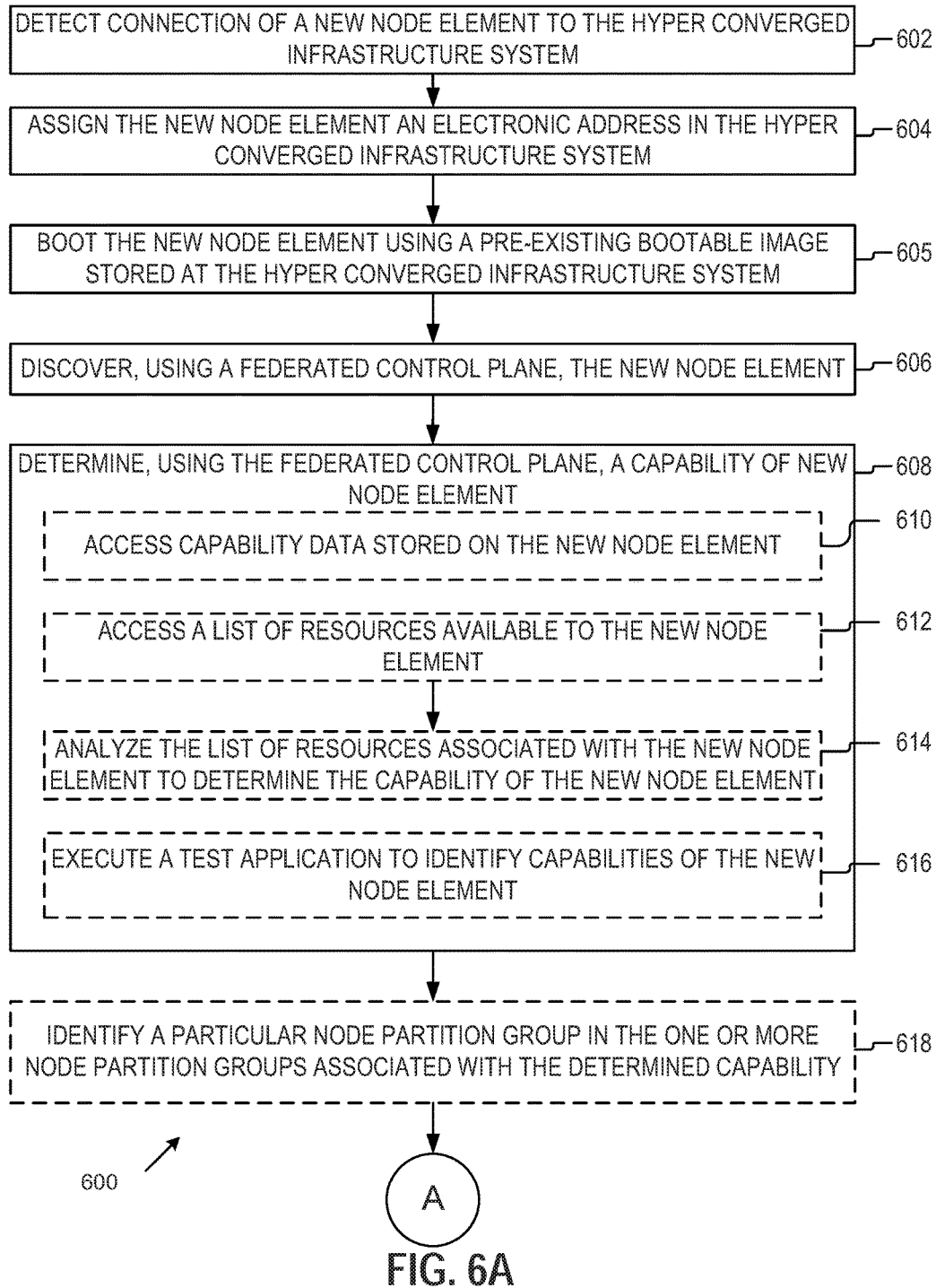
FIGS. 6A and 6B are flowcharts of an example method for detecting new node elements and assigning the new node to a node partition group in the hyper-converged infrastructure system.

FIG. 6 is a flowchart of an example method for detecting new node elements 112 and assigning the new node elements 112 to a node partition group 118 in the hyper-converged infrastructure system 100, in accordance with some example embodiments. In some example embodiments, a hyper-converged infrastructure system 100 may include a top switch 102 that connects to a plurality of node elements 112. In some example embodiments, the top switch 102 detects (602) a newly added node element 112. For example, a node element 112 is connected to the top switch 102 through the network ports of the top switch 102.

Once the newly added node element 112 is detected, the top switch 102 may assign (604) the newly added node element 112 a network address. The top switch may boot (605) the new node element from a pre-boot execution environment server 314. In some example embodiments, a DHCP server 312 may allocate a range of addresses for node elements 112 and allocate a specific network address for the newly added node element 112.

Using a federated control plane 108 running in a virtual machine 104 on the top switch 102, the top switch may discover (606) the newly added node element 112. In some example embodiments, the federated control plane 108 may discover the newly added node element 112 by receiving a notification from the newly added node element 112 as it is boot using an image from the pre-boot execution environment 314.

The federated control plane 108 may determine (608) a capability of the newly added node element 112. In some example embodiments, possible capabilities of a node element 112 include the processing capabilities of the newly added node element 112 (e.g., the speed of the processor(s), the number of threads that the processor(s) can execute at a single time, the number of floating point operations per second, and so on), the memory capabilities of the newly added node element 112 (e.g., the amount of memory available, the clock speed of the memory, the clock speed of the memory, the bandwidth of the memory, and so on), and the storage capabilities of the newly added node element 112 (e.g., the amount of storage available, the read and write speeds of the storage, and so on).

In some example embodiments, the capability of the newly added node element 112 is determined based on an analysis of one or more of the memory resources available to the newly added node element 112, the processing resources of the newly added node element 112, and the storage resources available to the newly added node element 112.

In some example embodiments, the federated control plane 108 may determine the capability of newly added node element 112 by accessing (610) capability data stored on the newly added node element 112. For example, a node element 112 includes metadata or other descriptive data that describes the specific capabilities of the node element including processing speed and bandwidth, the amount of memory and read/write speeds, and the amount of storage with accompanying read and write speeds (e.g., differentiating between random reads and writes and sequential reads and writes). In some example embodiments, this information may be pre-determined before the node element 112 is installed and available when requested by the federated control plane 108.

In some example embodiments, the federated control plane 108 may determine the capability of newly added node element 112 by accessing (612) a list of resources (e.g., 116 in FIG. 1) available to the newly added node element 112. For example, a particular node 112 includes a list of any and/or all associated resources 116 and provides that list upon request to the federated control plane 108. The federated control plane 108 analyzes (614) the list of resources associated with the newly added node element 112 to determine one or more capabilities of the newly added node element 112.

In some example embodiments, the federated control plane 108 may determine the capability of the newly added node element 112 by executing (616) executing a test application on the newly added node element 112, where the test application measures the performance of the newly added node element 112 to identify capabilities of the newly added node element 112. For example, the federated control plane 108 has one or more standardized benchmarking test applications that the newly added node element 112 can execute and will result in capability data being generated about the newly added node element's 112 processing, storage, and memory capabilities.

The federated control plane 108 may use (618) the determined capability of the newly added node element 112 to identify a particular node partition group 118 in the one or more node partition groups 118 associated with the determined capability. For example, node partition groups 118 may have an associated capability such as large memory resources (e.g., node partition group 118-3 as seen in FIG. 1), large processing resources (e.g., node partition group 118-1 as seen in FIG. 1), or both large processing resources and large memory resources (e.g., node partition group 118-4 as seen in FIG. 1). The federated control plane 108 may match the capability of the newly added node element 112 to one of the existing node partition groups 118 such that the capabilities of the newly added node element 112 may be similar to the capabilities common the identified node partition group 118.

Figure 6B:
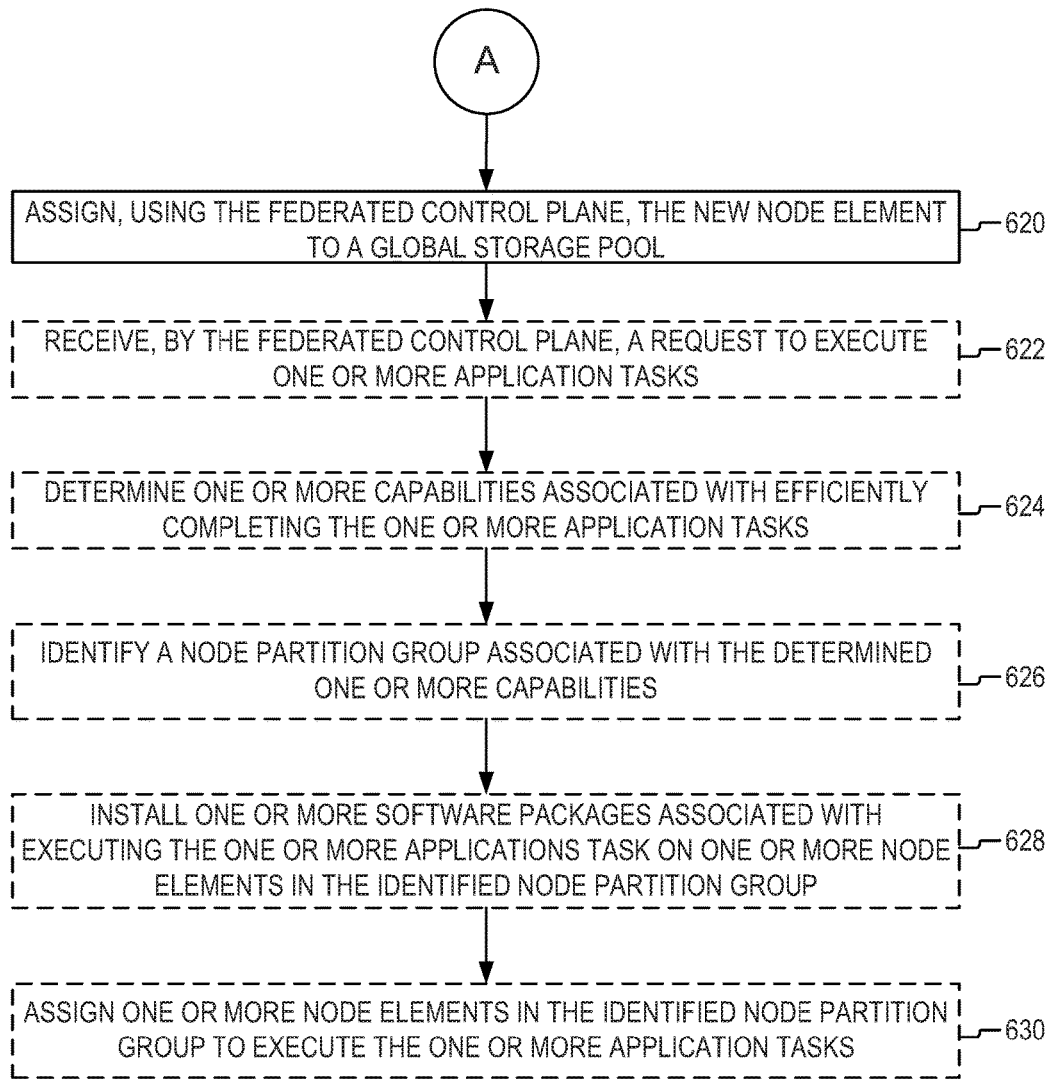

FIG. 6B is a flowchart of an example method for detecting new node elements 112 and assigning the new node elements 112 to a node partition group in the hyper-converged infrastructure system 100. Each of the operations shown in FIG. 6B may correspond to instructions stored in a computer memory or computer-readable storage medium. Optional operations are indicated by dashed lines (e.g., boxes with dashed-line borders). In some embodiments, the method described in FIG. 6B is performed by the hyper-converged infrastructure system 100. However, the method described can also be performed by any other suitable configuration of electronic hardware.

The federated control plane 108 may assign (620) the newly added node element 112 into the global storage pool 122. The global storage pool 122 is a group of storage devices on a plurality of different node elements 112 in a hyper-converged infrastructure system 100. A software defined storage system 106 provides virtualized access to the storage group 122 as a single pool, allowing the entire pool to be used/accessed by a third party without the third party knowing the actual details of how the different storage devices are managed.

In some example embodiments, the global storage pool 122 includes one or more node elements 112 assigned into one or more node partition groups 118. The node elements 122 may be assigned into node partition groups 118 based on the capabilities associated with a particular node element 112.

The federated control plane 108 may receive (622) a request to execute one or more application tasks. In some example embodiments, the request is received from a client system 208 or other third party system. In other embodiments, the request is generated internally and the request is for an application task that the hyper-converged infrastructure system 100 is requested to perform.

The federated control plane 108 may determine (624) one or more capabilities associated with efficiently completing the one or more application tasks. In some example embodiments, the request itself requests certain capabilities (e.g., a request may indicate that it is high priority and should be executed on the node partition group 118 with the highest processing capabilities). In some embodiments, the federated control plane 108 may analyze the characteristics of the application task (e.g., the number and frequency of calls to storage, the complexity and number of the calculations to be performed by the processor(s), the amount of working memory used, and/or so on) and determine which capabilities would help complete the application task as efficiently as possible.

The federated control plane 108 may identify (626) a node partition group 118 associated with the determined one or more capabilities. For example, if a task is determined to use a large amount of working memory, the federated control plane 108 may identify a node partition group 118 for node elements 112 that have additional amounts of RAM. In some example embodiments, these assignments also consider the current work load of nodes in a given node partition group 118, such that a secondary node partition group 118 is identified in the first identified node partition group 118 is too busy to complete the application task in an acceptable amount of time.

In some example embodiments, the federated control plane 108 may install (628) one or more software packages associated with executing the one or more application tasks on one or more node elements 112 in the identified node partition group 118. In some example embodiments, the request for the application task to be complete includes a description of any and software used to perform the requested application task. In further embodiments, the federated control plane 108 may have a list of tasks and maps them to specific application software.

The federated control plane 108 may assign (630) one or more node elements in the identified node partition group to execute the one or more application tasks. Once the application task has been completed, the assigned node element(s) 112 may return the output, if any, to the federated control plane 108. The federated control plane 108 may return the result to the requesting party.

In this manner, this disclosure provides an efficient method for hyper-converged infrastructure systems to use a variety of different node elements 112, each with different capabilities, while still efficiently allocating work within the system. Using the federated control plane 108 to a group of heterogeneous node elements 112 can be partitioned into node partition groups 118 such that application tasks can be deployed without any performance degradation.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. It will also be understood that the term "and/or" as used herein refers to and encompasses any and/or all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context

What is claimed is:

1. A computer-implemented method comprising:
    detecting connection of a new node element to a hyper-converged infrastructure system having at least one top switch that connects to a plurality of node elements that includes the new node element;
    assigning the new node element an electronic address in the hyper-converged infrastructure system;
    booting the new node element using a pre-existing bootable image stored in the hyper-converged infrastructure system;
    discovering, using a federated control plane hosted in the at least one top switch, the new node element;
    determining, using the federated control plane, a capability of the new node element; and
    assigning, using the federated control plane and based on the capability of the new node element, the new node element to a particular node partition group of a plurality of node partition groups, wherein the plurality of node elements are assigned into the plurality of node partition groups.

2. The computer-implemented method of claim 1, wherein determining the capability of the new node element is further based on one or more of memory resources available to the new node element, processing resources of the new node element, and storage resources available to the new node element.

3. The computer-implemented method of claim 1, wherein the plurality of node partition groups comprises a global storage pool including the plurality of node elements.

4. The computer-implemented method of claim 1, wherein assigning the new node element to the particular node partition group includes using the determined capability of the new node element to identify the particular node partition group in the plurality of node partition groups associated with the determined capability.

5. The computer-implemented method of claim 1, wherein determining, using the federated control plane, the capability of the new node element further comprises:
    accessing capability data stored on the new node element.

6. The computer-implemented method of claim 1, wherein determining, using the federated control plane, the capability of the new node element further comprises:
    accessing a list of resources available to the new node element; and
    analyzing the list of resources associated with the new node element to determine one or more capabilities of the new node element.

7. The computer-implemented method of claim 1, wherein determining, using the federated control plane, the capability of the new node element further comprises:
    executing a test application on the new node element, the test application measuring a performance value of the new node element to identify capabilities of the new node element.

8. The computer-implemented method of claim 1, further comprising:
    receiving, by the federated control plane, a request to execute one or more application tasks;
    determining one or more capabilities associated with efficiently executing the one or more application tasks; and
    identifying a node partition group associated with the determined one or more capabilities.

9. The computer-implemented method of claim 8, further comprising:
    installing one or more software packages associated with executing the one or more application tasks on one or more node elements in the identified node partition group; and
    assigning one or more node elements in the identified node partition group to execute the one or more application tasks.

10. A system comprising:
    a top switch that connects to node elements and is configured to execute a virtual machine that includes a federated control plane; and
    a plurality of node elements, each including a processor and memory, wherein:
        the top switch and the plurality of node elements comprise at least a portion of a hyper-converged infrastructure system;
        the plurality of node elements are configured for assignment to a plurality of node partition groups;
        the top switch is further configured to:
            detect a connection of a new node element from the plurality of node elements to the hyper-converged infrastructure system;
            assign the new node element an electronic address in the hyper-converged infrastructure system; and
            boot the new node element using a pre-existing bootable image stored in the hyper-converged infrastructure system; and
        the federated control plane is configured to:
            discover the new node element;
            determine a capability of the new node element; and assign, based on the capability of the new node element, the new node element to a particular node partition group of the plurality of node partition groups.

11. The system of claim 10, wherein the federated control plane is further configured to determine the capability of the new node element based on one or more of memory resources available to the new node element, processing resources of the new node element, and storage resources available to the new node element.

12. The system of claim 10, wherein the plurality of node partition groups comprises a global storage pool including the plurality of node elements.

13. The system of claim 10, wherein the federated control plane is further configured to use the determined capability of the new node element to identify a particular node partition group in the plurality of node partition groups associated with the determined capability.

14. The system of claim 10, wherein the federated control plane is further configured to access capability data stored on the new node element.

15. The system of claim 10, wherein the federated control plane is further configured to:
 access a list of resources available to the new node element; and
 analyze the list of resources associated with the new node element to determine the capability of the new node element.

16. The system of claim 10, wherein the federated control plane is further configured to execute a test application using the new node element, the test application measuring a performance value of the new node element to identify capabilities of the new node element.

17. The system of claim 10, wherein the federated control plane is further configured to:
 receive a request to execute one or more application tasks;
 determine one or more capabilities associated with efficiently executing the one or more application tasks; and
 identify a node partition group associated with the determined one or more capabilities.

18. The system of claim 17, wherein the federated control plane is further configured to:
 install one or more software packages associated with executing the one or more application tasks on one or more node elements in the identified node partition group; and
 assign one or more node elements in the identified node partition group to execute the one or more application tasks.

19. A system comprising:
 means for detecting connection of a new node element to a hyper-converged infrastructure system having at least one top switch that is configured to connect to a plurality of node elements that includes the new node element;
 means for assigning the new node element an electronic address in the hyper-converged infrastructure system;
 means for booting the new node element using a pre-existing bootable image stored at the hyper-converged infrastructure system;
 means for discovering, using a federated control plane hosted in the at least one top switch, the new node element;
 means for determining, using the federated control plane, a capability of the new node element; and
 means for assigning, using the federated control plane and based on the capability of the new node element, the new node element to a particular node partition group of a plurality of node partition groups, wherein the plurality of node elements are assigned into the plurality of node partition groups.

20. The system of claim 19, wherein determining the capability of the new node element is further based on one or more of memory resources available to the new node element, processing resources of the new node element, and storage resources available to the new node element.

* * * * *